United States Patent [19]

Wakabayashi

[11] 4,215,905

[45] Aug. 5, 1980

[54] WHEEL ASSEMBLY WITH BEARINGS

[75] Inventor: Takao Wakabayashi, Shinsenri-Minamimachi, Japan

[73] Assignee: Nakanishi Metal Works Co., Ltd., Osaka, Japan

[21] Appl. No.: 955,795

[22] Filed: Oct. 30, 1978

[30] Foreign Application Priority Data

Nov. 8, 1977 [JP] Japan .......................... 52-150290[U]

[51] Int. Cl.³ .......................... F16C 33/58; F16C 13/02
[52] U.S. Cl. .................................. 308/182; 308/6 R; 308/190
[58] Field of Search ................... 308/6 R, 16, 18, 182, 308/183, 190, 191, 210

[56] References Cited

U.S. PATENT DOCUMENTS

| 610,970 | 9/1898 | McAlpine | 308/183 |
|---|---|---|---|
| 810,438 | 1/1906 | Stickle | 308/182 |
| 2,022,348 | 11/1935 | Hoerle | 308/190 |
| 3,602,150 | 8/1971 | Frost | 308/6 R |

FOREIGN PATENT DOCUMENTS

| 839603 | 5/1952 | Fed. Rep. of Germany | 308/190 |
|---|---|---|---|
| 38017 | 3/1931 | France | 308/6 R |
| 602497 | 3/1960 | Italy | 308/190 |
| 137656 | 1/1920 | United Kingdom | 308/190 |

*Primary Examiner*—Richard R. Stearns
*Attorney, Agent, or Firm*—Armstrong, Nikaido, Marmelstein & Kubovcik

[57] ABSTRACT

A wheel assembly with bearings is provided which includes an axle, and a pair of hat-shaped wheels rotatably mounted on the axle spaced at a predetermined spacing from each other. A pair of wheel supporting members are mounted on the axle inside of the wheels. Each wheel and wheel supporting member has an inner ball race and an outer ball race, respectively. A series of balls are located between the inner and outer races. A spacer is mounted on the axle between the wheel supporting members, the spacer defining the spacing between the wheels.

2 Claims, 3 Drawing Figures

WHEEL ASSEMBLY WITH BEARINGS

BACKGROUND OF THE INVENTION

1. Field of the Invention

This invention relates to a wheel assembly with bearings, and more particularly to a wheel assembly with bearings for use in trolleys of a carrier in a power-and-free conveyor, the power-and-free conveyor transporting articles such as clothes, which are hung on the carrier, in such places as distribution center, warehouse, or production flow line, etc.

2. Description of the Prior Art

A conventional wheel assembly with bearings for use in the trolleys in the power-and-free conveyor, comprises an axle, and a pair of wheels rotatably mounted on the axle spaced at a specified distance from each other, the wheels having cavities for receiving bearings. Radial bearings are mounted on the axle in the cavities of the wheels. Each of the radial bearings comprises an inner ring mounted on the axle, an outer ring rigidly secured within the cavity of the wheel, a series of balls located between the inner and outer rings, and a retainer which maintains a spacing between the balls. Further, three sleeves are mounted on the axle to rigidly secure the inner rings of the bearings. Thus, the conventional wheel assembly with bearings requires a large number of parts such as the inner rings, the outer rings, and the sleeves, which render the wheel assembly complex and costly.

SUMMARY OF THE INVENTION

This invention provides a wheel assembly with bearings which has a simplified structure and a small number of parts.

The wheel assembly with bearings of the present invention comprises an axle, a pair of wheel supporting members mounted on the axle spaced at a predetermined distance from each other, a pair of wheels rotatably mounted on the axle so as to surround the wheel supporting members, and a spacer means for defining a spacing between the wheels mounted on the axle between the wheel supporting members. Each wheel supporting member has an inner race, each wheel has an outer race which faces the inner race on the wheel supporting member, and a series of rolling means are positioned between the inner race and the outer race.

Preferably, each inner race comprises a tapered and curved portion formed at an inner end of the wheel supporting member. And, each wheel is hat-shaped and comprises an inner annular flange, an outer annular flange, and a cylindrical portion continuously interconnecting the flanges and integral therewith, the inner flange and the outer flange extending radially inwardly and outwardly from opposite ends of the cylindrical portion, respectively. Each outer race comprises an inner surface of a connecting portion between the inner annular flange and the cylindrical portion. In this construction, an angular contact ball bearing is composed of the inner race on the wheel supporting member, the outer race on the wheel, and a series of balls located between the inner and outer races, the bearing being able to support both radial and thrust load. The wheel is easily made of a piece of pressed metal plate. Changing the size of the wheel will be easy, if the wheel is made by pressing.

BRIEF DESCRIPTION OF THE DRAWINGS

Other features and advantages of the invention will appear from the description to follow of embodiments disclosed in the accompanying drawings.

In the drawings.

DETAILED DESCRIPTION OF THE PREFERRED EMBODIMENT

In this embodiment of the invention, wheel assemblies with bearings are applied to trolleys of a carrier in a power-and-free conveyor.

Figure 1:
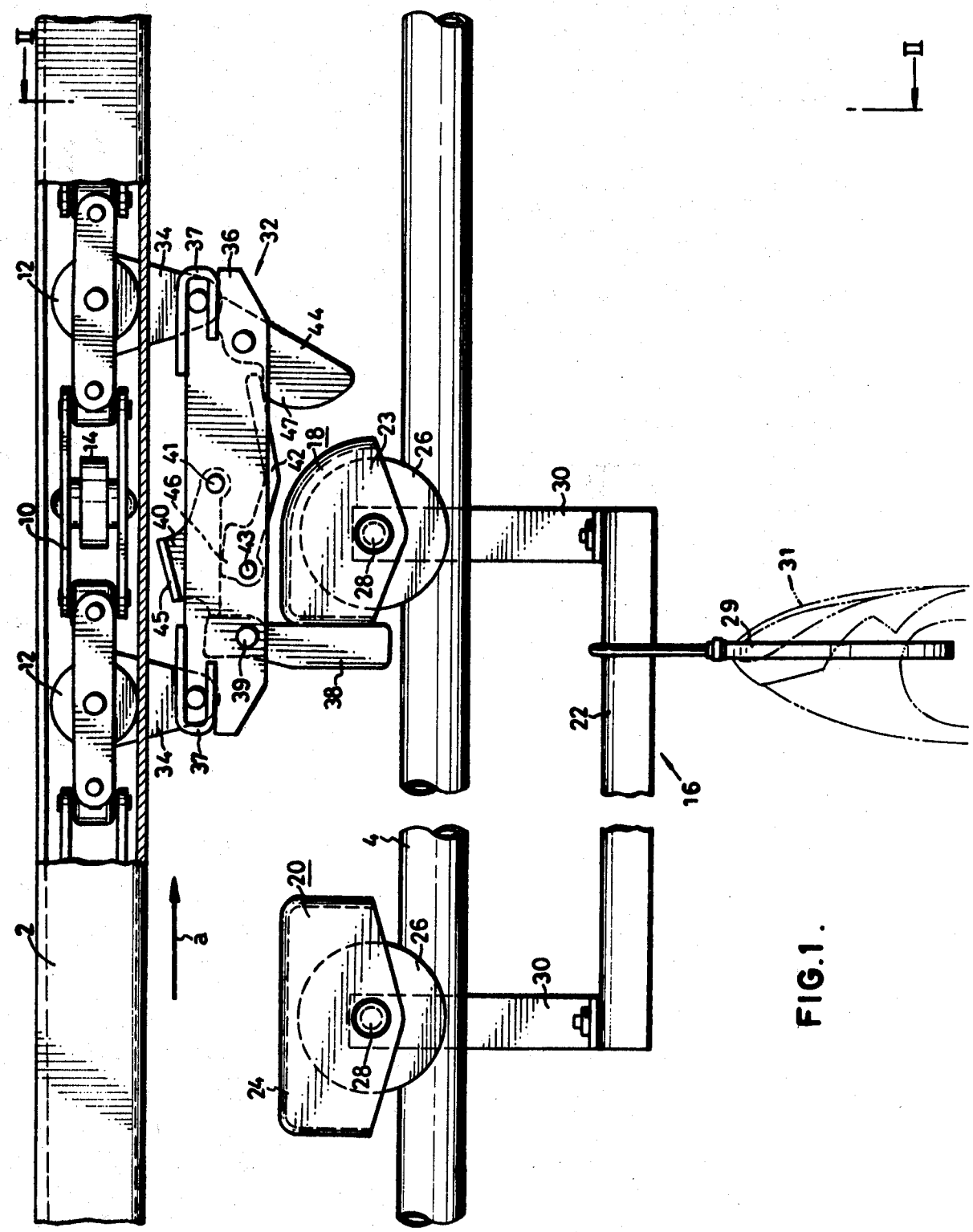
FIG. 1 is a side elevation showing a power-and-free conveyor.
Figure 2:
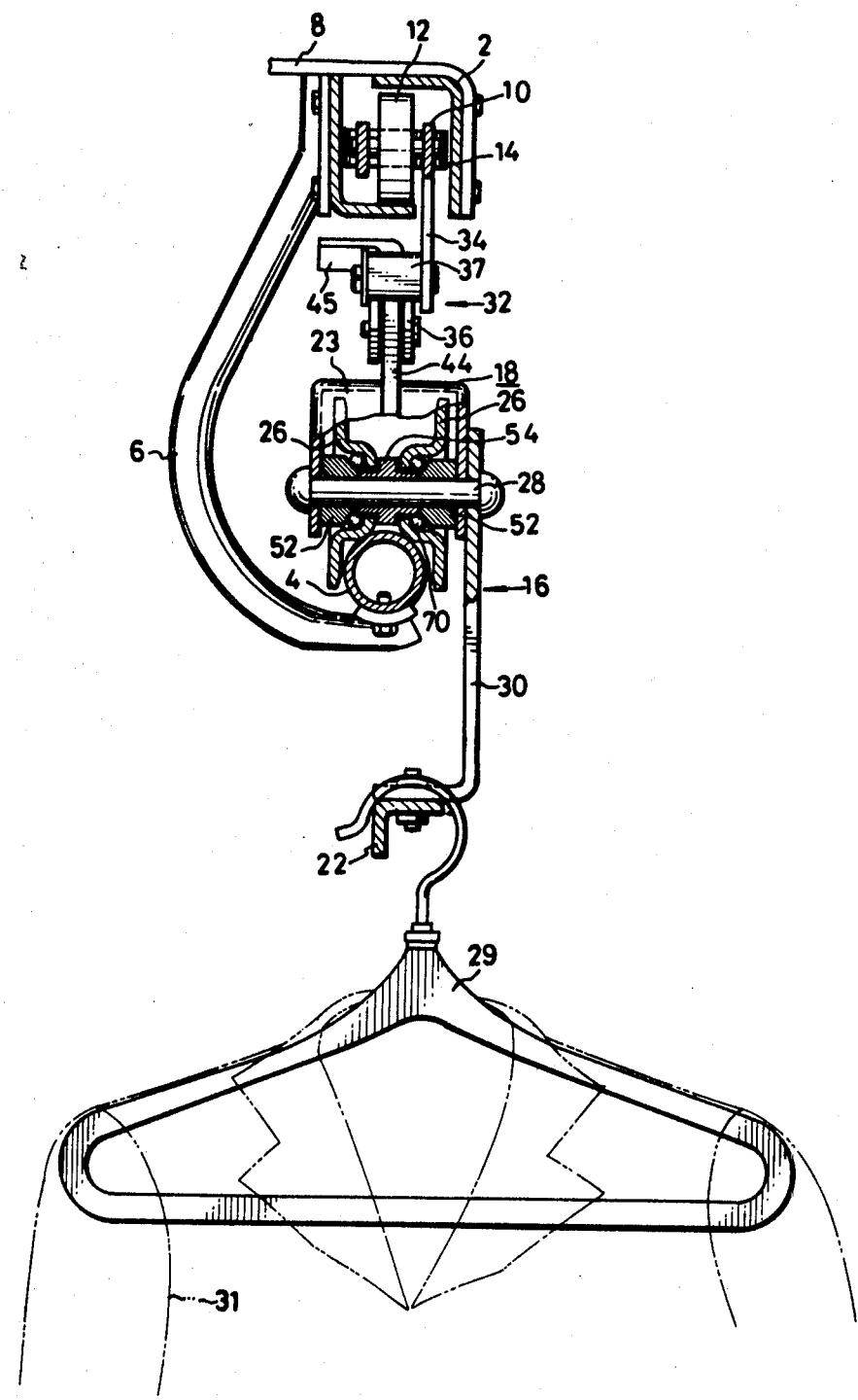
FIG. 2 is a view in section taken along the line II—II in FIG. 1.

Referring to FIGS. 1 and 2, a power-and-free conveyor includes a power rail 2 and a free rail 4 spaced vertically at a predetermined distance from each other, the free rail 4 being provided below the power rail 2. The power rail 2 comprises a pair of L-shaped steel members arranged substantially in the form of a square-shaped cross section. The free rail 4 comprises a steel pipe. The rails 2 and 4 are connected to each other by connecting arms 6 arranged at a specified intervals and are suspended by supporting members 8. A drive chain 10 in the power rail 2 has pairs of vertical power trolleys 12 and horizontal power trolleys 14 positioned between pairs of vertical power trolleys 12, each trolley being rollable on the power rail 2. The power trolleys 12 and 14 are positioned at intervals along the drive chain 10. The drive chain 10 is driven at all times in the direction of an arrow a shown in FIG. 1.

A carrier 16 which travels on the free rail 4, comprises a pair of front and rear free trolleys 18 and 20, and a connecting link 22 which interconnects free trolleys 18 and 20. The front and rear trolleys 18 and 20 have front and rear covers 23 and 24, respectively, the bottoms of which are opened. Pairs of wheels 26 in the covers 23 and 24 are rotatably mounted on axles 28 by means of the bearings of this invention, axles 28 being fixedly supported to the covers 23 and 24. The free trolleys 18 and 20 are provided with downwardly directed arms 30 the upper end of which are fixed to the covers 23 and 24 at one end of the axles 28. The opposite ends of the link 22 are horizontally pivotally connected to the lower end of the arms 30. A hanger 29 on which a suit of clothes 31 is hung, is hung on the link 22.

A propelling member 32 is attached to the drive chain 10 by means of supporting arms 34 at points where the power trolleys 12 are provided. The propelling member 32 comprises a pair of side plates 36 arranged in parallel with each other and U-shaped connecting pieces 37 which interconnect the side plates 36. The propelling member 32 has a pusher dog 38, a stopper 40, a stopper raising lever 42, and a lever receiving piece 44, each of which is pivotally supported to the side plates 36. The pusher dog 38 is pivoted by a pin 39 at an upper portion thereof. The stopper 40 pivoted by a pin 41 at its front end, stops the pusher dog 38 in a vertical downwardly directed position by engagement of the free end thereof with the top of the pusher dog 38, where the pusher dog 38 can engage with the front free trolley 18 so that the carrier 16 is driven together with the drive chain 10 in the direction of the arrow a. The stopper 40 has a pusher dog disengaging portion 45 extending outwardly therefrom. When the carrier 16 reaches a location where a stopping means (not shown) is disposed, the stopping means having a stopper raising member which is projectable into the path of travel of the pusher dog disengaging portion 45, the pusher dog disengaging portion 45 comes into contact with the stopper raising member which has already projected into the path and the stopper 40 is raised, whereupon the pusher dog 38 is released from the stopper 40 and is disengaged from the trolley 18. As a result of that the carrier 16 is brought to a stop. The stopper raising lever 42 pivoted at its rear end by a pin 43, has at its rear portion an upwardly extending projection 46 for receiving and raising the stopper 40. The lever receiving piece 44 pivoted at its upper portion by a pin 45, has a receiving portion 47 on which the free end of the stopper raising lever 42 is received. The top of the lever receiving piece 44 is in contact with the connecting piece 37, so that the lever receiving piece 44 is supported such that the piece 44 is obliquely directed rearwardly and downwardly.

Figure 3:
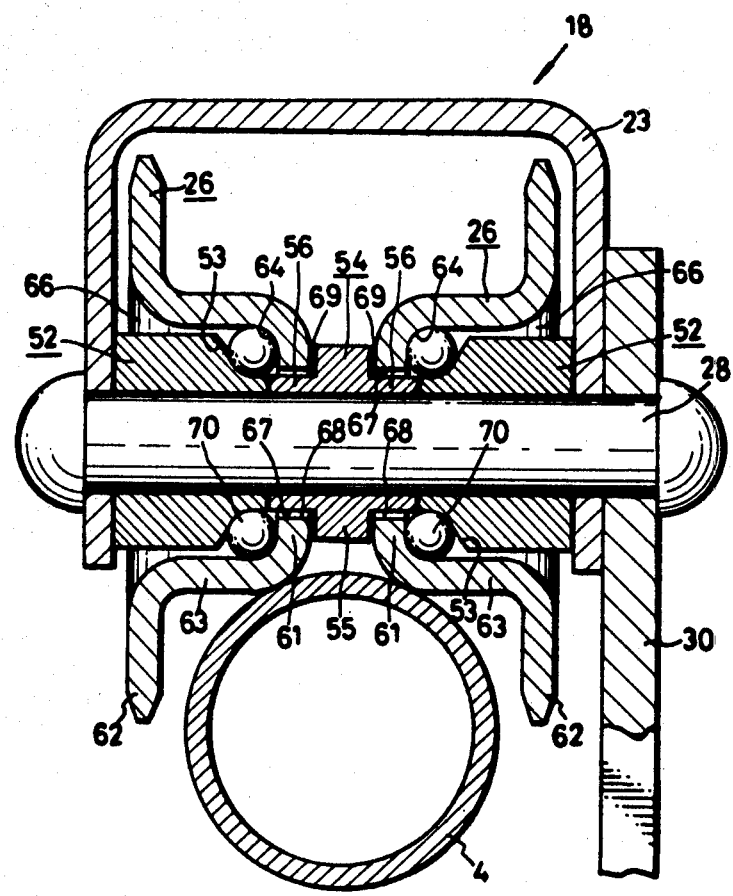
FIG. 3 is an enlarged view in section showing a wheel assembly with bearings.

With reference to FIG. 3, a pair of wheel supporting members 52 are rigidly mounted on the axle 28 spaced at specified distance from each other. Each wheel supporting member 52 is of a generally cylindrical form and has a tapered and curved portion 53 at an inner end thereof, the curved portion 53 being an inner race. A spacer 54 is rigidly mounted on the axle 28 between the wheel supporting members 52. The spacer 54 has a large diameter portion 55 in the middle thereof and small diameter portions 56 at its opposite ends. The spacer 54 defines a spacing between the wheels 26. The opposite end surfaces of the spacer 54 are in abutment with the inner end surfaces of the wheel supporting members 52. The outer end surfaces of the wheel supporting members 52 are also in abutment with the inner surfaces of the cover 23. The wheel 26 is hatshaped and comprises an inner annular flange 61, an outer annular flange 62, and a cylindrical portion 63 continuously interconnecting the flanges 61 and 62 and integral therewith, the flanges 61 and 62 extending radially inward and outward from the opposite ends of the cylindrical portion 63, respectively. The wheel 26 has an internal cup-shaped cavity 66 defined by the inner flange 61 and cylindrical portion 63, the cavity having an aperture 67 at the inner end thereof. The circumferential inner surface of the cavity 66 is smoothly curved from the cylindrical portion 63 to inner annular flange 61, the curving portion 64 serving as an outer race. The wheels 26 are so mounted on the axle 28 that a portion of the wheel supporting member 52 is in the cavity 66 of the wheel 26 and that the small diameter portion 56 of the spacer 54 is placed in the aperture 67 with a radial clearance 68. The inner race 53 on the wheel supporting member 52 and the outer race 64 on the wheel 26 confront each other. A series of balls 70 are located between the inner race 53 and outer race 64. There is an axial clearance 69 between the inner flange 61 of the wheel 26 and the large diameter portion 55 of the spacer 54, the clearance 69 being so small that the balls 70 are not out of the races 53 and 64. A bearing comprises the inner race 53 on the wheel supporting member 52, the outer race 64 on the wheel 26, and the balls 70 located between the races 53 and 64, the bearing being an angular contact ball bearing which can support a load applied at an angle with respect to the axis. Preferably, the wheel is made by pressing a metal plate such as steel plate, aluminum plate, etc.

In the foregoing assembly, the trolleys 18 and 20 have a pair of wheels 26 respectively, and the spacer 54 is interposed between the wheels 26, so that each trolley is in contact with the free rail 4 at two points when the trolleys are on the free rail 4. The contact points on the free rail 4 are slightly lower than the top thereof. Thus, the trolleys 18 and 20 of the carrier 16 can travel with stability along the free rail 4. While the carrier 16 is traveling, the force which inclines to move the wheels 26 to the outer side, is caused by reaction at the contact points. In this situation, the bearing assembly of this invention, which is the angular contact ball bearing as described above, can support both the radial load and the thrust load which arise during the travel of the carrier 16. The axial clearance 69 permits the free motions of the balls 70, which result in the smooth rotation of the wheels 26. The spacer 54, especially the large diameter portion 55 thereof, maintains the distance between the wheels 26 and prevents the distance from becoming narrower than the regular spacing when the carrier 16 is taken off from the free rail 4, whereby the balls 70 in the races 53 and 64 do not fall out.

The wheels 26 in the pair are formed separately and are individually rollable. When the carrier 16 is traveling along the curved portion of the free rail 4, the wheel 26 positioned on the inner side with respect to the curving direction may decrease its rotative speed, and the other wheel 26 may increase, so that the trolleys 18 and 20 can travel smoothly with stability along the curved portion of the free rail 4. Further, the outer flanges 62 of the wheels 26 prevent the trolleys from being derailed, when the trolleys 18 and 20 are traveling in an inclined position by the travel along the curved portion of the free rail 4 or by a side to side swinging motion.

It is possible to adjust the spacing between the outer flanges 62 of the wheels 26 by changing the length of the large diameter portion 55 of the spacer 54 or by uniformly changing the lengths of the cylindrical portions 63 of the wheels 26. It is better to enlarge the spacing between the outer flanges 62 of the wheels 26 in the case such that the diameter of the free rail 4 is large or the curvature of the curved portion of the free rail 4 is large. If the wheels are made by pressing, it is more economical to enlarge the length of the large diameter portion 55 of the spacer 54 than to enlarge the length of the cylindrical portion 63 of the wheel 26, because it will not be necessary to draw the wheel deeper. For the purpose of preventing the trolleys from derailing, it is preferable to extend the outer flanges 62 of the wheel 26 in correspondence with the diameter of the free rail 4. In any event, changing the size of the wheel 26 may be easy, if the wheel is made by pressing, because it is easy to draw the wheel deeper and to extend the outer flange of the wheel.

It is possible to use a series of rollers instead of balls. The spacer means can comprises only the large diameter portion. In this case, the wheel supporting member will have a portion corresponding to the small diameter portion of the spacer, or the inner flange of the wheel will be extended more toward the axle. It is also possible that the spacer means can comprise a coil spring mounted on the axle between the wheel supporting members, the coil spring may or may not be provided at opposite ends thereof with disks which are in contact with the inner flange of the wheel. The role of the wheel supporting member is to receive the balls or rollers on its inner race and to support the wheel by the medium of the balls or rollers. Thus it is apparent that the wheel supporting member can have any shape as long as it is provided with an inner race.

What is claimed is:

1. A wheel assembly with bearings comprising:
   (a) an axle;
   (b) a pair of hat-shaped wheels independently rotatably mounted on the axle spaced at a predetermined spacing from each other, each of the wheels having an internal cup-shaped cavity, the cavity having a circumferential inner surface portion serving as an outer race and an aperture through the bottom thereof;
   (c) a pair of wheel supporting members mounted on the axle in the cavities of the wheels, each of the wheel supporting members having a tapered and curved portion serving as an inner race at an inner end thereof;
   (d) a plurality of balls positioned between the outer races of the wheels and the inner races of the wheel supporting members; and
   (e) a spacer means for defining the spacing between the wheels and the spacing between the wheel supporting members, the spacer means being mounted on the axle between the wheel supporting members and having a large diameter portion in the middle thereof and small diameter portions at its opposite ends, the small diameter portion being placed in the aperture of the wheel with a radial clearance, and the large diameter portion facing the wheel with an axial clearance.

2. A wheel assembly as defined in claim 1 wherein each wheel comprises an inner annular flange, an outer annular flange, and a cylindrical portion continuously interconnecting the flanges and integral therewith, the inner flange and the outer flange extending radially inwardly and outwardly from opposite ends of the cylindrical portion, respectively, and wherein each said outer race comprises an inner surface of the connecting portion between the inner annular flange and the cylindrical portion.

* * * * *